United States Patent Office 3,412,159
Patented Nov. 19, 1968

3,412,159
PROCESS OF PREPARING NORBORNANDIOLS
Jan W. H. Faber and William F. Fowler, Rochester, N.Y., assignors to Eastman Kodak Company, Rochester, N.Y., a corporation of New Jersey
No Drawing. Filed Apr. 27, 1965, Ser. No. 451,302
3 Claims. (Cl. 260—617)

ABSTRACT OF THE DISCLOSURE

Polyhydric alcohols containing norbornane nuclei are prepared by reacting one part bicyclo[2.2.1]heptadiene or bicyclo[2.2.1]hept-5-ene-2-ol acrylate with from 2 to 8 parts water or diol, and catalyzing the reaction with from 0.3 to 5% acid, based on the weight of the water or diol.

---

This application relates to the preparation of polyhydric alcohols, and more specifically to the preparation of polyhydric alcohols containing norbornane nuclei.

Polyhydric alcohols containing norbornane nuclei are highly useful plasticizers for gelatin coating compositions, such as gelatin silver halide emulsions. Gelatin coatings plasticized with these polyhydric alcohols are substantially free from curl when coated on flexible supports even when stored at low relative humidity. However, no suitable commercial process for preparing such polyhydric alcohols has been disclosed in the literature.

One object of this invention is to provide a novel method for the preparation of polyhydric alcohols containing norbornane nuclei. Another object of this invention is to provide a novel one-step method for the preparation of said polyhydric alcohols. A further object of this invention is to provide a novel method for preparation of polyhydric alcohols containing norbornane nuclei, which does not result in the formation of objectionable by-products. Other objects of this invention will be apparent from the disclosure herein.

These and other objects of this invention are obtained by mixing a norbornane derivative selected from the group consisting of bicyclo[2.2.1]heptadiene and bicyclo[2.2.1]hept-5-ene-2-ol acylates, with water or a polyhydric alcohol, heating the mixture of reactants and catalyzing the reaction with a strong acid.

The preparation of norbornanediols by the addition of water to bicyclo[2.2.1]heptadiene and bicyclo[2.2.1]hept-5-ene-2-ol acetate are shown in Examples 1 and 2.

EXAMPLE 1

In a 5-liter flask equipped with a thermometer, reflux condenser and stirrer was placed 1 liter (10 moles) of bicyclo[2.2.1]heptadiene, 3 liters of water, and 100 ml. of sulfuric acid. The mixture was boiled with vigorous stirring under reflux for approximately 80 hours during which time the reflux temperature rose from 77° C. to 99° C., and the reaction mixture became cloudy but homogeneous. The mixture was carefully cooled, neutralized with sodium hydroxide, and evaporated to dryness under reduced pressure from a water aspirator. The residual solid was dissolved in two liters of boiling isopropyl acetate, and the inorganic salts were removed by filtration. The filtrate was treated with activated carbon, filtered and cooled to yield 1 kg. (92%) of white crystals, M.P., 175–185° C.

EXAMPLE 2

One liter of bicyclo[2.2.1]hept-5-ene-2-ol acetate was substituted for the bicyclo[2.2.1]heptadiene in Example 1, and the procedure was repeated to obtain a 90% yield of the same product.

The acid catalyzed addition of polyhydric alcohols to the norbornene and norbornadiene starting materials employed in this invention are shown in Examples 3 and 4.

EXAMPLE 3

2,5- or 2,6-bis(2-hydroxyethoxy)norbornane

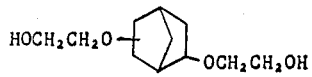

In a five-liter flask equipped with stirrer, reflux condenser and thermometer were placed 500 cc. (5 moles) of bicyclo[2.2.1]heptadiene, three liters of ethylene glycol and 10 g. of p-toluenesulfonic acid.

The mixture was refluxed for six hours with very vigorous stirring. During this time the temperature rose from 88–89° C. to 99–105° C. The reaction mixture at this point was homogeneous. The contents of the flask were poured on ice. A small amount of water-insoluble material was removed by ether extraction. The water solution was treated with a little sodium carbonate, treated with decolorizing carbon, filtered and distilled.

Water and ethylene glycol were removed under water aspirator vacuum and the product was distilled at 189–194°/200μ. The yield was 1080 g. (94.7 percent).

EXAMPLE 4

2,5- or 2,6-bis(2,3-dihydroxypropoxy)norbornane

In a five-liter flask equipped with stirrer, thermometer and reflux condenser were placed 500 cc. (5 moles) of bicyclo[2.2.1]heptadiene, three liters of glycerol and 10 g. of p-toluenesulfonic acid. The mixture was heated on a steam bath with vigorous stirring for 16 hours and then the reaction mixture was poured on ice. Water-insoluble material was removed by ether extraction and the water solution treated with decolorizing carbon, filtered and distilled. The yield was 277.5 g. of distillable material which boiled at 190°/14μ.

Other polyhydric alcohols which can be made in accordance with the process described in the foregoing examples include the following:

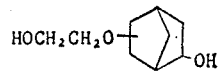

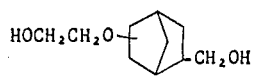

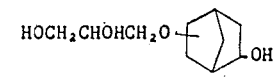

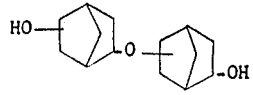

The starting materials which we employ in our invention include bicycloheptadiene, and bicycloheptenol acylates such as bicyclo[2.2.1]hept-5-ene-2-ol acetate. When the starting materials employed in the invention contain an acyl group, it is preferred that the acyl radicals contain not more than 4 carbon atoms, the acetyl esters being particularly useful. However, the acyl groups may contain considerably higher numbers of carbon atoms, such as hexyl or dodecyl, but the longer caron chains entail the necessity for employing a higher reaction temperature. The preferred starting material of our invention is bicycloheptenol acetate, which is economically prepared from vinyl acetate and cyclopentadiene.

The above starting materials are reacted in accordance with this invention with either water or a polyhydric alcohol. Any suitable polyhydric alcohol may be used, including those having the formula ROH wherein R represents an alkyl group, preferably of 1 to 10 carbon atoms, or a cycloalkyl group (preferably of 4 to 7 carbon atoms) in which at least one hydrogen atom has been replaced by a hydroxyl group, such as β-hydroxyethyl, dihydroxybutyl, hydroxypropyl, hydroxycyclohexyl, or hydroxy substituted norbornyl.

The acid catalysts which we may employ in our invention are strong acids which have an ionization constant of at least $1 \times 10^{-2}$ or higher, such as perchloric, p-toluenesulfonic acid and sulfuric acids, mineral acids being particularly useful. These acids are employed in the reaction mixture preferably at concentrations of about .03–3% based on the weight of the glycol or water, although a broader concentration range, such as from about 0.03–5% may be employed if desired. Higher concentrations may be used, but such use results in the formation of large quantities of inorganic salt when the reaction mixture is neutralized.

The reaction of our invention is preferably effected by employing in the reaction mixture one part of one of the norbornene or norbornadiene starting materials listed above and about 3 to 6 parts of a dilute solution of an acid in water or a polyhydric alcohol, the acid preferably being concentrated sulfuric acid in an amount sufficient to give a concentration in the reaction mixture of about 3%. The ratio of starting material to the aqueous or alcoholic acid solution may be varied over a wider range, for instance about one part of starting material to 2 to 8 parts of the acid solution. However, if the ratio of the starting norbornene or norbornadiene compound in water or polyhydric alcohol is greater than one part norbornene or norbornadiene to two parts aqueous acid, e.g., 1/1, the reaction becomes very slow and objectionable amounts of polymeric ethers are formed.

The reaction of our invention is preferably carried out with brisk stirring and at elevated temperatures, such as from about 50° C. up to reflux temperatures, although other reaction conditions may be employed if desired. It is believed that various isomers, such as 2,5-, 2,6-, and 2,7 - bicyclo[2.2.1]heptane diols are formed by the reaction of the invention, although it is extremely difficult to determine just which are formed.

As employed herein, the term norbornane refers to a bridged, 7 carbon atom bicyclic ring system, also known as norcamphane and bicyclo[2.2.1]heptane. The polyhydric norbornane derivatives prepared in accordance with the invention are useful as chemical intermediates, and as plasticizers for synthetic and natural resins, such as gelatin.

The invention has been described in detail with particular reference to preferred embodiments thereof but it will be understood that variations and modifications can be effected within the spirit and scope of the invention as described hereinabove and as defined in the appended claims.

We claim:

1. The process of preparing norbornanediols which comprises reacting one part bicyclo[2.2.1]hept - 5 - ene- 2 - ol acylate, said acyl group containing from 1 to 4 carbon atoms, with about two to eight parts by weight of water containing about .03 to 5%, based on the weight of the water, of an acid having an ionization constant of at least $1 \times 10^{-2}$, at reflux until the diol is formed; cooling the reaction mixture and neutralizing it with an alkali metal hydroxide; separating the inorganic salts; and, recovering the norbornane diol.

2. The process of preparing norbornanediols which comprises reacting one part bicyclo[2.2.1]hept - 5 - ene- 2 - ol acylate, said acyl group containing from 1 to 4 carbon atoms, with about two to eight parts by weight of water containing about .03 to 5%, sulfuric acid, based on the weight of the water, at reflux until the diol is formed; cooling the reaction mixture and neutralizing it with an alkali metal hydroxide; separating the inorganic salts; and, recovering the norbornane diol.

3. The process of preparing norbornanediols which comprises refluxing one part bicyclo[2.2.1]hept - 5 - ene- 2 - ol acetate with about three parts by weight of water containing about 3% sulfuric acid based on the weight of the water until the diol is formed, cooling the reaction mixture and neutralizing it with an alkali metal hydroxide, separating the inorganic salts and recovering the norbornane diol.

References Cited

UNITED STATES PATENTS

| 2,136,011 | 11/1938 | Humphrey. |
| 2,345,573 | 4/1944 | Bruson. |
| 2,730,548 | 1/1956 | Bluestone et al. |

BERNARD HELFIN, *Primary Examiner.*